UNITED STATES PATENT OFFICE.

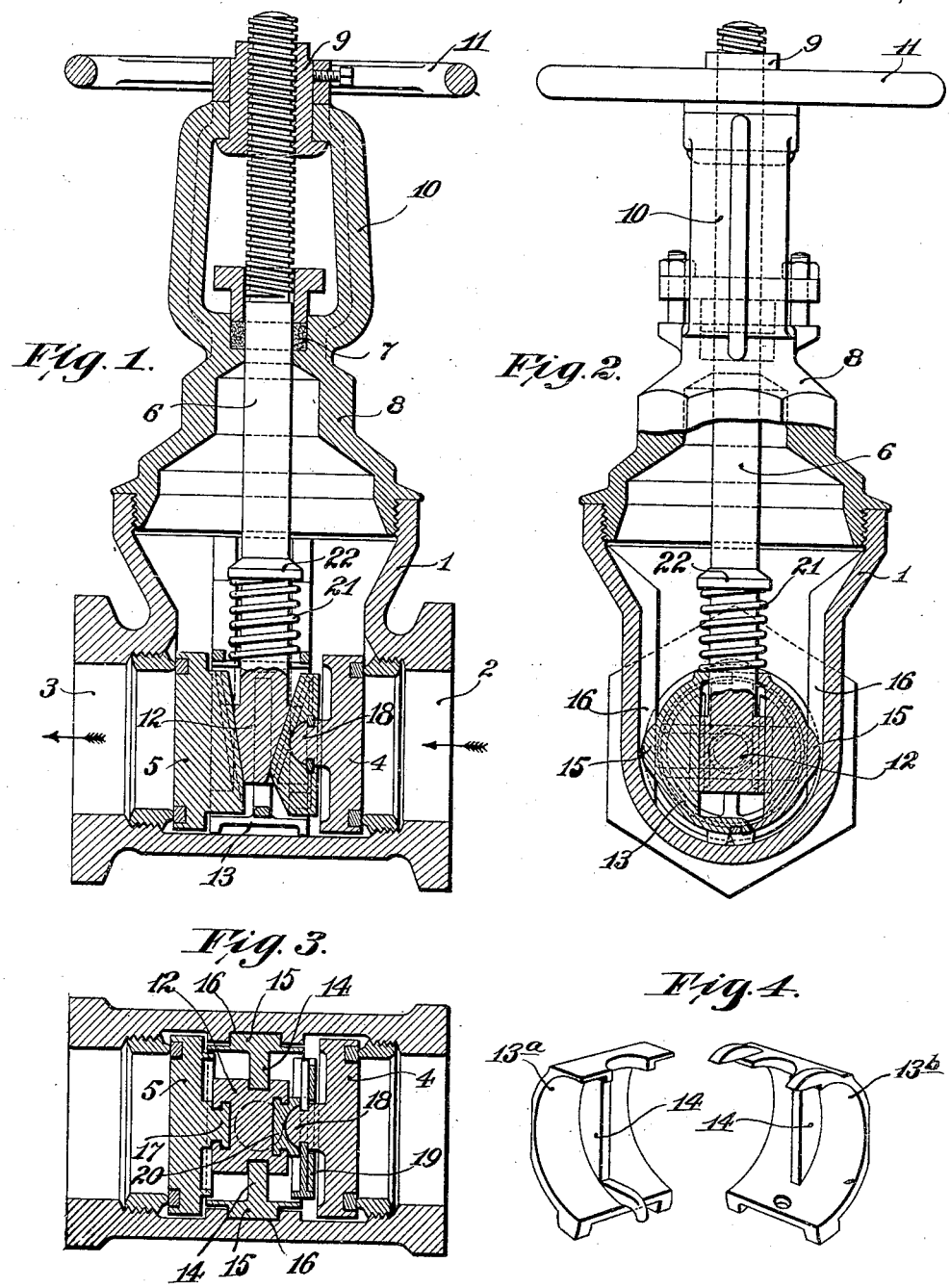

EUGENE D. JEFFERSON, OF LOWELL, MASSACHUSETTS.

GATE-VALVE.

936,454.  Specification of Letters Patent.  Patented Oct. 12, 1909.

Application filed October 3, 1907. Serial No. 395,662.

*To all whom it may concern:*

Be it known that I, EUGENE D. JEFFERSON, a citizen of the United States, residing at Lowell, in the county of Middlesex and State of Massachusetts, have invented certain new and useful Improvements in Gate-Valves; and I do hereby declare the following to be a full, clear, and exact description of the invention, such as will enable others skilled in the art to which it appertains to make and use the same.

The present invention relates to improvements in gate valves.

In the use of gates and valves in connection with fluids under high pressure it has been found that at the first opening and the last closing movement of a valve the friction of the valve member on the seat and the erosion of the fluid caused by the rapid flow are so great as to cause excessive wear, so that the valve soon becomes unfit to perform its function properly, owing to the destruction of the accurate engagement between the valve surface and seat. This effect is so marked that it has sometimes been found necessary, when a valve in a high pressure system is to be opened or closed, to temporarily stop the pump by which the pressure is maintained, thereby relieving the pressure while the valve is being operated, or to equalize the pressure on the opposite sides of the valve by means of a by-pass, in order to avoid excessive wear on the seats.

The object of the present invention is to produce a gate valve for use in connection with high pressure systems, which may be opened or closed under pressure without substantial injury from erosion, and in which the pressure of the valve member against its seat due to the pressure may be more easily overcome than in the usual form of gate valve, so that the wear due to friction is largely eliminated and it is possible that a large valve working under great pressure may be readily opened or closed.

The invention consists in the gate valve hereinafter described and claimed.

In the drawings, Figure 1 is a vertical longitudinal section of a gate valve embodying the present invention; Fig. 2 is a vertical transverse section; Fig. 3 is a horizontal section of the valve; and Fig. 4 is a perspective view of the two parts of the cage.

The illustrated embodiment of the invention comprises a body 1 provided with openings 2 and 3 for inlet and outlet, closed respectively by a valve 4 and a valve 5. The valves are opened and closed by means of a stem 6 passing through a stuffing box 7 in the dome 8 forming a part of the valve body, and the stem is moved up or down to open or close the valve by means of a nut 9 mounted in a yoke 10 on the dome 8 and actuated by a hand wheel 11. The lower end of the stem 6 is provided with a wedge 12 to move the valves toward and from the seats, as is common in such constructions, and the valves and the wedge are maintained in proper relative position, and also guided in their vertical movements, by means of a cage 13, which is provided with guides 14 engaging vertical grooves in the wedge 12, as shown in Fig. 3, and with flanges 15 engaging vertical guideways 16 formed in the interior surface of the valve body 1. The cage is made of two parts $13^a$ and $13^b$, as illustrated in Fig. 4; the part $13^a$ being provided with a locking projection adapted to engage a coöperating hole in the part $13^b$, and the part $13^b$ being provided with two projections adapted to fit over a coöperating surface on the part $13^a$, whereby the parts are held in operative position. The wedge engages directly an inclined T-shaped projection 17 on the back of the valve 5, these parts having an interlocking relation to enable the wedge to draw the valve back from its seat against the water pressure. The valve 4 is connected, by means of a universal joint 18, with a follower 19 which is provided with a T-shaped extension 20 engaging the wedge in a similar manner to the extension 17 on the other valve. A compression spring 21 engages at one end a collar 22 on the valve stem, and presses against the cage 13, tending normally to force the cage and the valves downwardly with respect to the valve stem so as to hold the valves in retracted position when the valve stem is raised.

The construction of the gate valve, as so far described, (excepting the cage 13) is substantially the ordinary form of construction for such valves, and the invention consists in the particular forms of the wedge and the coöperating members. In such gates, as usually constructed, both valves are withdrawn from their seats simultaneously or at substantially the same speeds, and from this it results that when the opening movement of a valve begins the friction of the valve on the seat cuts both seat and valve and before the valves are wide open a considerable quantity of fluid flows between the valves and their seats where such gates are used in high pressure systems, and considerable erosion of the valves and valve seats results, making it necessary frequently to refit the valves. In the present invention these results are entirely avoided by so constructing the valve operating mechanism that one valve is opened substantially before or faster than the other. In this manner the valve which opens later operates as a guard for the first opening valve, since it prevents flow through the latter while it is removed only a short distance from its seat. In the illustrated embodiment of the invention this result is accomplished by making the angle between the wedge 12 and the coöperating valve members greater in the case of one of the valves, as 4, than in the case of the other valve, as 5. The one valve, therefore, is opened quickly upon the first upward movement of the stem 6 and while the other valve 5 is still closed or substantially closed. The valve 5 prevents any substantial flow through the valve 4, while it is being removed from its seat, and the valve 5 is not substantially removed from its seat until the valve 4 has been opened sufficiently wide to avoid danger of erosion.

It is preferred to install the valve with the greater angle side toward the inlet or pressure for the reason that when so installed the greater angle valve being the "tight" valve, the valve chamber is thereby securely cut off from the pressure as a result of which the valve stem packing is accessible for renewal without putting the valve out of commission. But the valve may be installed with the smaller angle valve on the inlet or pressure side with the sacrifice, however, of the advantage above referred to when installed in the other way.

The fundamental principle of the present invention resides in preserving one of the valves from excessive friction and erosion as a consequence of which the valve as a whole retains its efficiency for a long time. For example, with the preferred method of installation the "tight" valve is the inlet or pressure valve 4. In opening the valve, the valve member 4 is first withdrawn from its seat without friction, because it is in a direction at right angles to the plane of the seat, and without substantial erosion because only so much fluid can pass as is necessary to fill the valve chamber. Therefore the inlet valve is withdrawn sufficiently from its seat so as to be preserved from wire drawing during the opening of the valve 5. With the valve 5 acting as the inlet or pressure valve, the valve 4 still remains the "tight" valve because it is withdrawn from its seat sufficiently to prevent erosion when the valve 5 begins to open. In other words the valve 4 being withdrawn from its seat more rapidly than the valve 5 the erosion at the valve 4 is less than that at the valve 5 because only so much fluid can act to erode the valve 4 as passes the valve 5 and the opening being at least twice as large at the valve 4 as at the valve 5 it is thereby preserved from erosion.

A further advantage of this construction resides in the slight angle between the outlet valve 5 and the wedge. Owing to this the outlet valve can be removed from its seat against a heavy pressure, permitting the use of the gate in systems in which it has been previously impossible to operate a gate while under pressure.

The invention is not limited to the details of construction and operation of the illustrated embodiment but may be embodied in other forms broadly defined in the claims.

Having now described the invention, what is claimed is:—

1. A gate valve having, in combination, a casing provided with an inlet and an outlet, an inlet valve, an outlet valve, and means for opening and closing the valves arranged to open and close the inlet valve in a comparatively short time with respect to the outlet valve, substantially as described.

2. A gate valve having, in combination, a casing provided with an inlet and an outlet, an inlet valve, an outlet valve, and means for moving the valves directly toward and away from their seats, arranged to move one valve faster than the other, substantially as described.

3. A gate valve having, in combination, a casing provided with an inlet and an outlet, an inlet valve, an outlet valve, and means for moving the valves first directly away from their seats and then removing them transversely, in opening the gate, said means being arranged to move the inlet valve away from its seat more rapidly than the outlet valve, substantially as described.

4. A gate valve having, in combination, a casing provided with an inlet and an outlet, an inlet valve, an outlet valve, a wedge for moving the valves directly toward and from their seats, and means for actuating the wedge to open and close the gate, the wedge presenting different inclinations to the two valves so as to move one faster than the other toward and from its seat, substantially as described.

5. A gate valve having, in combination, a casing provided with an inlet and an outlet, an inlet valve, an outlet valve, a vertically movable cage in which the valves are horizontally movable, a wedge located between the valves in the cage, and having surfaces of different inclinations engaging the valves, and means for actuating said parts arranged to first move the wedge relatively to the cage to remove the valves directly from their seats and then move the cage and the valves to remove them from the line of flow, substantially as described.

6. A gate valve having, in combination, a casing provided with inlet and outlet valves, valve members therefor, means for actuating the valves and a two-part cage for carrying the valves and actuating means, the cage parts being held together by the casing, substantially as described.

In testimony whereof I affix my signature, in presence of two witnesses.

EUGENE D. JEFFERSON.

Witnesses:
ANNIE C. RICHARDSON,
FRED O. FISH.